United States Patent
Batscheider et al.

[11] 4,016,656
[45] Apr. 12, 1977

[54] METHOD AND ARRANGEMENT FOR THE NATURAL VITAMINIZING OF GRAIN

[75] Inventors: Alfred Batscheider, Porza, Lugano, Switzerland; Jiri Bernasek, Hamburg, Germany

[73] Assignee: Alfred Batscheider, Porza, Lugano, Switzerland

[22] Filed: Apr. 28, 1975

[21] Appl. No.: 572,254

[30] Foreign Application Priority Data

Apr. 30, 1974 Germany .......................... 2420910

[52] U.S. Cl. .................................... 34/12; 34/60; 34/64

[51] Int. Cl.$^2$ .......................................... F26B 7/00

[58] Field of Search .............. 34/12, 13, 60, 61, 62, 34/63, 64

[56] References Cited

UNITED STATES PATENTS

| | | | |
|---|---|---|---|
| 929,481 | 7/1909 | Paul | 34/12 X |
| 1,920,107 | 7/1933 | Richardson | 34/12 |
| 1,949,427 | 3/1934 | McComb | 34/13 |
| 2,227,634 | 1/1941 | Dalin | 34/13 X |
| 2,283,319 | 5/1942 | Dienst | 34/65 X |
| 2,297,685 | 10/1942 | Brier et al. | 34/12 |
| 2,397,363 | 3/1946 | Mcheod | 34/61 |

*Primary Examiner*—John J. Camby
*Attorney, Agent, or Firm*—Michael J. Striker

[57] ABSTRACT

Grain is cleaned in a dry state and then admitted into a washing chamber for the removal of residual contaminants. The grain is then introduced into a centrifugal dryer where excess water is removed. Sufficient water remains in the grain so that it has a moisture content between 18 and 24% by weight. This moisture content is such that the outer layers of individual grains become swollen thereby activating enzymes in the outer layers which are capable of synthesizing vitamins while, however, initiation of germination of the grain is avoided. The grain is now conveyed into a heating chamber where it is heated to temperatures between 25° and 35° C. Thereafter, the grain is admitted into an insulated silo composed of corrosion-resistant material where it remains for a period of 5 to 30 hours while the moisture content and temperature are maintained within the respective ranges indicated above. In the silo, vitamins are synthesized by the activated enzymes. The grain travels through the silo and, in order to ensure that this occurs in a uniform manner, a vibrating valve is provided in the region of the outlet end of the silo. Subsequent to issuing from the silo, the grain may optionally be conveyed through a stream chamber for the purpose of destroying microorganisms which may be present in the grain. Also optionally, the grain may be held at temperatures between 40° and 50° C after issuing from the silo in order to permit decomposition of Phytin to occur. Thereafter, the grain is dried to a moisture content between 14 and 16% by weight so as to bring the grain into a grindable state. The grain may be brushed and exposed to suction so as to remove and separate loosened skin and other contaminants from the grain. The thus-treated grain is particularly well-suited for processing into foods. On the one hand, the baking characteristics of the grain are good since the quality and quantity of the gluten present in the grain are retained, which is not the case when germination of the grain occurs. On the other hand, the nutritional value of the grain is high due to the vitamins synthesized by the activated enzymes.

35 Claims, 1 Drawing Figure

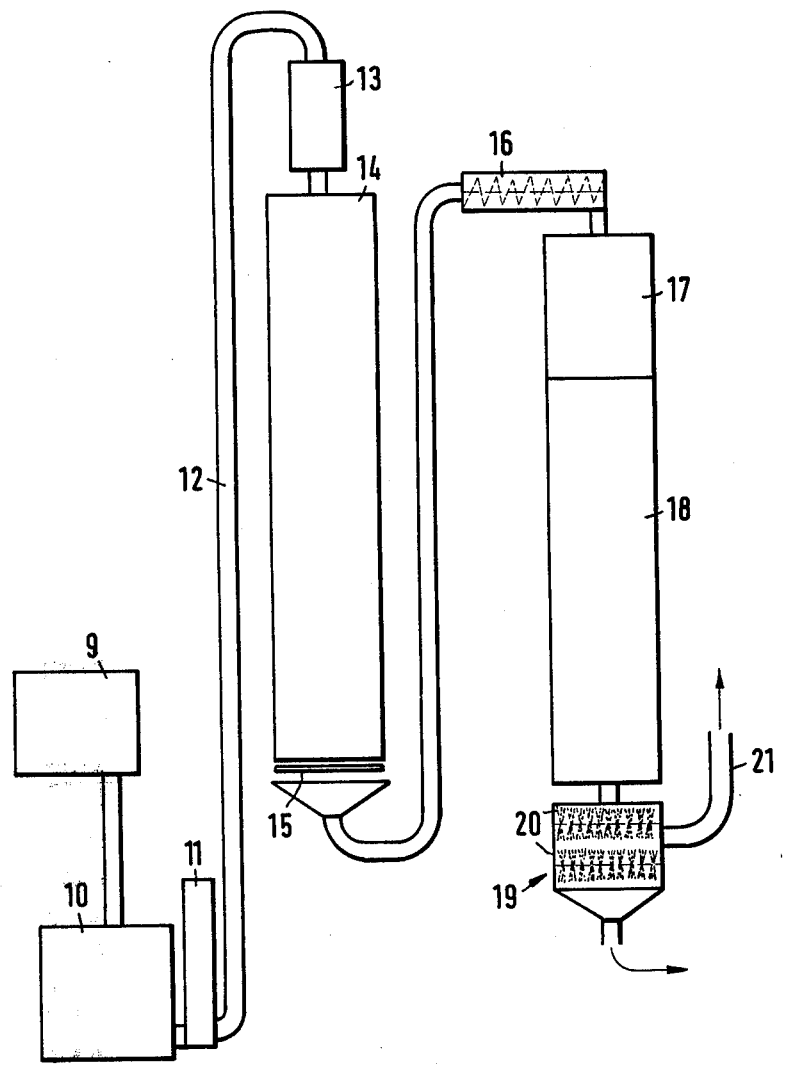

METHOD AND ARRANGEMENT FOR THE NATURAL VITAMINIZING OF GRAIN

BACKGROUND OF THE INVENTION

The invention relates generally to a method and arrangement for the vitaminizing of grain, that is, for the enrichment of grain in vitamins. Of particular interest to the invention is the vitaminizing of cereal grain for the subsequent processing thereof into food or food staples.

It is known that sprouts require vitamins for their development and that a large number of vitamins for the early development of the sprouts is stored in the grain kernels. It is further known that additional vitamins are synthesized in germinating grain kernels. For instance, it has been determined that, after a germination period of 5 days in wheat, substantially larger quantities of certain vitamins are present than in non-germinated wheat. Additional vitamins are synthesized during the germination phase because the quantities of vitamins stored in the grain are not sufficient to fulfill their functions as growth and working substances for the sprouts. The additional vitamins are synthesized with the aid of enzyme systems which are present in the developed and germination-capable grain kernels and which enable all of the vitamins present in the grain kernels to be synthesized.

Attempts have been made to increase the vitamin content of grain by germination but, despite the physiological nutritional advantages of the germinated grain which are provided by the synthesis of the vitamins, it has not been possible heretofore to make use of grain which has been pretreated in this manner for human nutrition to any significant extent. The reason for the limited utilization of germinated grain for human nutrition resides, above all, in the fact that the originally present properties of the grain which are required for baking purposes are lost by virtue of the germination process. Thus, important supply and nutrient substances such as starches, lipides and albumin are already rapidly decomposed during the initial germination phase, that is, even before the embryos have broken out of the pods. In particular, the gluten content of the grain and the quality of the gluten are adversely affected by the germination process. This leads to the result that, without special further treatment and without admixtures such as coarse ground grain or flour to increase the quality, germinated grain is no longer capable of being baked subsequent to comminution. In addition to this, there is the consideration that, by virtue of the drying operation to which germinated grain must be subjected for the further processing thereof, the germinated grain becomes withered and spoils rapidly.

It will thus be appreciated that improvements in the state of the art are desirable.

SUMMARY OF THE INVENTION

It is, accordingly, a general object of the invention to provide a method and arrangement for the vitaminizing of grain.

Another object of the invention is to provide a method and arrangement which enable grain to be vitaminized in such a manner that the grain nevertheless remains suitable for human consumption.

A further object of the invention is to provide, by means of a special treatment, for the synthesis of vitamins in grain kernels which are suited or intended for human nutrition. This is to be accomplished such that the usability of the grain for nutritional or enjoyment purposes and, in particular, for further processing by baking, will not be destroyed, and not even affected, thereby.

An additional object of the invention is to provide, by the treatment of grain with moisture and heat under certain well-defined conditions, for an additional natural enrichment of the grain kernels, with all of the vitamins present in the kernels, which goes far beyond the conventional degree of enrichment occurring during the known germination of grain. Concomitantly, the decomposition of Phytin is to be achieved. This is to be accomplished by an activation, in the outer layers of the grain kernels, of the enzymes which are capable of synthesizing vitamins without, however, causing the germination process as such, and the associated decomposition of the main nutrient substances, to proceed.

These objects, as well as others which will become apparent, are achieved in accordance with the invention. According to one aspect of the invention, there is provided a method for the natural vitaminizing of grain wherein the moisture content of grain is adjusted to within a predetermined moisture content range such that enzymes capable of synthesizing vitamins are activated while initiation of germination of the grain is substantially avoided. The moisture content of the grain is maintained substantially within the predetermined moisture content range for a predetermined time interval during which the grain is held at temperatures within a predetermined temperature range such that the enzymes synthesize vitamins.

The grain may be cleaned in a dry state prior to adjustment of the moisture content so as to remove contaminants. The grain may also be washed prior to adjustment of the moisture content thereof in order to remove contaminants or contaminant residues.

The adjustment of the moisture content may involve increasing the moisture content of the grain so as to cause the outer layers of the individual grains or kernels to become swollen and thereby cause enzymes capable of synthesizing vitamins to be activated in the outer layers. It is preferred to adjust the moisture content of the grain to a value between about 18 and 24% by weight and, advantageously, to a value between about 18 and 20% by weight. A particularly favorable value for the moisture content of the grain is about 20% by weight. In such an event, it is further favorable for the moisture content of the grain to be maintained substantially constant at a value of about 20% by weight during the time the grain is held within the predetermined temperature range for the synthesis of vitamins.

The temperatures at which the grain is held for the synthesis of vitamins are preferably in the range of about 25° to 35° C. Advantageously, the grain is held at temperatures between about 28° and 30° C. The heating of the grain to the temperatures used for the synthesis of vitamins is favorably carried out subsequent to adjustment of the moisture content of the grain.

The time interval for which the grain is held at the temperatures used for the synthesis of vitamins may be between about 5 and 30 hours. This time interval is favorably between about 10 and 30 hours and, particularly advantageously, is approximately 20 hours.

In accordance with the invention, it is advantageous for the grain to be agitated while being held at the temperatures used for the synthesis of vitamins. Where necessary, the grain may, subsequent to washing and adjustment of the moisture content thereof, be subjected to an additional treatment so as to maintain the moisture content within the predetermined moisture content range while the grain is held at these temperatures. For instance, the moisture content of the grain may be maintained substantially within the predetermined moisture content range by supplying water to the grain from a water supply grid or network. It is also possible to maintain the moisture content of the grain substantially within the predetermined moisture content range by automatically spraying regulated quantities of water onto the grain. According to one embodiment of the invention, the moisture content of the grain is maintained substantially constant while the grain is held at the temperatures used for the synthesis of vitamins.

Subsequent to being held at the temperatures used for the synthesis of vitamins, the grain may be cooled and may also be dried so as to transform it into a grindable state. The drying of the grain so as to transform it into a grindable state preferably involves drying to such an extent that the moisture content of the grain lies between about 14 and 16% by weight.

In accordance with one of the embodiments of the invention, the grain is agitated during the drying operation so as to cause the individual grains or kernels to abrade one another. The grain may then be subjected to a brushing action subsequent to the drying operation so as to loosen contaminants from the grain. Here, the grain may also be exposed to suction subsequent to the drying operation in order to permit separation of the contaminants from the grain.

An embodiment of the invention contemplates treating the grain subsequent to holding it at the temperatures used for the synthesis of vitamins so as to cause decomposition of Phytin. This treatment may involve holding the grain at temperatures between about 40° and 50° C and, advantageously, between about 40° and 45° C. The time for which the grain is held at the temperatures used for the decomposition of Phytin may, for instance, be of the order of 60 minutes. The treatment of the grain so as to cause Phytin to decompose may be carried out prior to cooling of the grain from the temperatures used for the synthesis of vitamins. It is possible to substantially continuously heat a stream of the grain to the temperature range of about 40° to 50° C which is used for the decomposition of Phytin.

A particular effect may be obtained by virtue of the invention. This resides in that at least portions of the outer skins of the individual grains or kernels may become loosened and roll up due to the cooling of the grain from the temperatures used for the decomposition of Phytin taken in conjunction with the swelling of the outer skins of the grains or kernels which occurs by virtue of the adjustment of the moisture content of the grain to within the predetermined moisture content range. Accordingly, the grain may be subjected to a mechanical treatment, subsequent to the drying of the grain which is carried out in order to transform it into a grindable state, so as to free the grain from the loosened portions of the outer skins. In this manner, 50% and more of the detectable contaminants may also be removed from the grain. The mechanical treatment may involve subjecting the grain to a brushing action.

The grain may also be exposed to suction so as to aid in the removal of the loosened portions of the outer skins and the detectable contaminants from the grain.

Optionally, the grain may be treated subsequent to being held at the temperatures used for the synthesis of vitamins so as to cause the destruction of microorganisms which may be present in the grain. This treatment may, for instance, involve holding the grain at a temperature of about 70° C for a period of approximately 3 minutes. This treatment, which may be carried out in the presence of steam, may be performed prior to the treatment of the grain so as to cause the decomposition of Phytin.

Another aspect of the invention relates to an arrangement for the natural vitamizing of grain which includes means for adjusting the moisture content of grain to within a predetermined moisture content range. Container means is provided for accommodating the grain at temperatures within a predetermined temperature range while the moisture content of the grain is maintained substantially within the predetermined moisture content range.

Means may be provided upstream of the container means or container for cleaning the grain in a dry state prior to entry thereof into the container. Heating means for heating the grain prior to entry thereof into the container may also be arranged upstream of the container. The heating means may include a temperature register.

If necessary, water supply means may be provided for supplying water to the interior of the container. The water supply means may, for example, be in the form of a water supply network or grid. It is also possible for the water supply means to be in the form of a spraying device which automatically sprays regulated quantities of water into the interior of the container. In addition, temperature regulating means may, if necessary, be provided to regulate the temperature interiorly of the container.

The arrangement of the invention may also include means downstream of the container for heating the grain which issues from the container, preferably continuously, to temperatures sufficient for the decomposition of Phytin to occur. This means may, for instance, be in the form of a heating zone through which the grain passes continuously and which is so constructed that the grain remains in the zone for a period of about 60 minutes.

The arrangement may also optionally comprise means downstream of the container for causing the destruction of microorganisms which may be present in the grain issuing from the container. According to one embodiment of the invention, this means includes a steam chamber. A conveyor, which is advantageously in the form of a screw conveyor, may be provided for conveying the grain through the steam chamber.

Brush means may be arranged downstream of the container for cleaning the grain which issues from the latter. In addition, suction means for separating contaminants from the grain may be provided downstream of the container.

The arrangement also favorably includes a drying means downstream of the container for drying the grain which issues from the latter. In this manner, the moisture content of the grain may be adjusted so as to transform the grain into a grindable state.

The container for accommodating the grain is favorably insulated. It is further of advantage for the container to comprise, or to be composed of, a corrosion-resistant material. In accordance with the invention, the container may be in the form of a round silo.

A preferred embodiment of the invention contemplates for the container to have an inlet end and an outlet end and for an agitable member to be provided in the region of the outlet end for permitting substantially uniform travel of the grain from the inlet end towards the outlet end. The agitable member may, for example, be in the form of a vibratory sieve, a vibratory valve or the like.

It is also contemplated for the container means to have a substantially vertical orientation and for grain admitting means to be provided in the region of the upper end portion of the container and grain withdrawing means to be provided in the region of the lower end portion thereof. Favorably, the grain withdrawing means is effective for permitting the grain to issue from the container substantially uniformly and in a manner such that mixing of the grain is substantially avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE schematically illustrates one form of arrangement in accordance with the invention which may be used for carrying out a method according to the invention.

DESCRIPTION OF THE PREFERRED EMBODIMENTS

One advantageous aspect of the invention relates to a method for the natural vitaminizing of cereal grain for the subsequent processing thereof to coarse ground grain, meal flour, bread, particularly whole-wheat bread, fresh grain products and beverages having a grain basis wherein, after cleaning the grain in a dry state and a subsequent wash, additional water is brought into contact with the grain if necessary. This aspect of the method of the invention is characterized in that the water content of the grain is increased to a value of about 18 to 24% and, in particular, to a value of about 20% (swelling of the outer layers). The grain is then heated to a temperature of 25° to 35° C and, in particular, 28° to 30° C, and stored for a period of approximately 5 to 30 hours while being subjected to motion. Favorably, the grain is stored for a period of 10 to 30 hours and, particularly advantageously, for a period of about 20 hours. The moisture content is maintained constant at 18 to 24% by weight and, in particular, at 20% by weight. Thereafter, the grain is cooled and also dried back to a moisture content such that the grain is suitable for grinding (14 to 16% by weight of moisture).

According to a further feature of this aspect of the invention, the grain is heated to temperatures between about 40° and 50° C and, particularly, to temperatures between about 40° and 45° C, for a period of approximately 60 minutes prior to being cooled and dried back to a moisture content suitable for grinding. A special effect is obtained by virtue of this additional treatment. Thus, due to the subsequent cooling to room temperature, the outer skins of the grains or kernels become loosened so that they may be removed by a further treatment. Such treatment favorably involves a light brushing and/or a rubbing of the grains or kernels against one another.

Another method aspect of the invention, wherein grain is subjected to a specific treatment with moisture and heat, is also set forth and similarly relates to the enrichment of grain with natural vitamins for the subsequent processing thereof to bread, particularly whole-wheat bread, other baked goods, meal flour, coarse ground grain, particularly whole coarse ground grain, flakes, fresh grain products and other foods or food staples. Thus, a method for the natural vitaminizing of grain and for the decomposition of Phytic acid is provided which, as before, is intended to increase the physiological nutritional values of such foods and food staples. Similarly to the previously outlined method aspect, the grain is cleaned in a dry state, subsequently washed and thereafter caused to undergo an activation process in the outer layers of the individual grains or kernels. In correspondence to the method aspect described above, the moisture content of the grain is increased to a value between about 18 and 24% by weight. As before, the moisture content is favorably increased to a value between about 18 and 20% by weight and, particularly advantageously, to a value of about 20% by weight. Again, the grain is then heated to temperatures between about 25° and 35° C and, in particular, to temperatures between about 28° and 30° C. The heating of the grain may, for instance, be accomplished by passing the grain through a heating shaft (register). The grain is stored in a container for a period of approximately 5 to 30 hours while the moisture content is held constant at values between about 18 and 24% by weight and, in particular, at values between about 18 and 20% by weight. Again, it is particularly favorable to hold the moisture content substantially constant at a value of about 20% by weight. As was the case previously, a storage period of about 5 to 30 hours is preferred whereas a storage period of about 20 hours is of particular advantage. In the instant method aspect, the thus-treated grain is subsequently permitted to pass through a steam chamber (approximately 3 minutes at approximately 70° C; destruction of microorganisms) which is provided with a conveyor, the latter preferably being in the form of a screw conveyor. Thereafter, the grain is conveyed into a heating shaft wherein it is continuously heated to temperatures between about 40° and 50° C and, in particular, to temperatures between 40° and 45° C, for a period of about 60 minutes (decomposition of Phytin). Subsequently, the grain is cooled as well as dried back to a moisture content such that the grain is transformed into a grindable state (about 14 to 16% by weight of moisture).

As indicated previously, the invention also encompasses an arrangement for the natural vitaminizing of cereal grain, that is, for the enrichment of a cereal grain with natural vitamins. The arrangement of the invention is particularly well-suited for carrying out the method aspects of the invention. The arrangement in accordance with the invention includes a container or activator for accommodating grain while it is held at temperatures between about 25° and 35° C with the moisture content being maintained at values between about 18 and 24% by weight. A preferred embodiment of the arrangement is characterized in that the container or activator is in the form of an insulated round silo of a non-corroding material having an agitable discharge member to ensure, as far as possible, an absolute uniformity in the downward movement of the contents of the silo.

The activator may be constructed in the form of an upright container member having a material inlet at the upper side thereof and a material outlet at the lower side thereof which permits a substantially uniform withdrawal of the contents without mixing of the same.

Generally speaking, it is pointed out that an important part of the invention is directed to a vitamin enrichment in grain without germination of the same. The surprising findings reside in that, by virtue of the treatment according to the invention, vitamins are additionally synthesized in grain kernels to a greater extent than occurs during germination of the grain. This better result as opposed to germination is clearly to be traced back to the fact that vitamins are used up during the germination process. An important characteristic of the invention accordingly lies in the activation of the synthesis of vitamins in grain kernels without, however, starting the germination process.

In the method according to the invention, a substantially smaller quantity of additional water than is required for the germination of the grain is brought into contact with the grain. For example, the germination of wheat first begins at a water content of 55% as calculated on the dry weight. This means that the germination process starts only when the swollen kernel contains at least 35% water. In the invention, by contrast, only the outer layers of the grain kernels become swollen due to the relatively small additions of water which are used. As a result, it is only in the outer layers of the kernels that the enzymes capable of synthesizing vitamins are activated. The germination process is, however, avoided. The water in the outer layers of the grain kernels has the effect that only the enzyme colloids are transformed into the gel state, this being precisely sufficient for their activation.

In the method according to the invention, the amylases, proteases and lipases are also not activated. By virtue of this, no decomposition of the nutrient substances occurs, this being in contrast to what is the case during germination of the grain. As a result, in addition to the extraordinary enrichment of vitamins, a further important advantage is achieved. This resides in that the grain which is treated in accordance with the invention retains its original properties, namely, gluten content and gluten quality, which are relevant to baking. After drying back to the original moisture content, the viability of the thus-treated grain is therefore not reduced. The enrichment according to the invention involves at least most of the vitamins present in the grain kernels or which are first synthesized therein during germination, such vitamins including $B_1$, C, E, K, carotene and inositol. Other vitamins which may be mentioned include $B_2$, $B_6$, D, niacin, pantothenic acid, folic acid and biotin. To illustrate the yields obtainable for the enrichment according to the invention, it may be mentioned that it is possible, after an activation period of 9 to 10 hours, for instance, to achieve an enrichment ranging from about 60% (for thiamin) to 150% and more (for lactoflavin and folic acid). The yields for all other vitamins lie within these limits.

In order that the natural vitaminizing of the grain according to the rules set forth by the invention may be carried out with optimum results, it is desirable that certain conditions be fulfilled. Advantageously, only healthy grain, which is substantially free of outgrowths and breakages and which includes as great a proportion (e.g. 95%) as possible of kernels capable of germinating, is used. Moreover, the thorough cleaning of this selected grain in the dry state according to industrial mill practice, as well, also, as all of the following processing operations, should be carried out so carefully that they do not endanger or influence the germinating capacity of the grain.

Referring now to the single FIGURE, it is pointed out that this represents one form of an arrangement according to the invention which may be used for carrying out a method in accordance with the invention. The reference numeral 9 identifies a device which is used for cleaning the grain in a dry state. The grain which has been cleaned in a dry state is thereafter washed with ample quantities of fresh water (3 to 5 liters of water per kilogram of grain) in order to remove dirt which adheres to the outer skins of the kernels, as well as water-soluble contamination residues, as far as possible. For this purpose, the grain is admitted into the washing device 10 which may, for example, be in the form of a "Miag" grain washing apparatus. Subsequently, the grain is introduced into a centrifugal dryer 11 where it is freed from excess water. The centrifugal dryer 11 should not injure the grain since the capability of the grain to germinate must be maintained under all circumstances.

During the treatment in the washing device 10, the enzymes residing in the outer layers of the kernels of the grain are brought into the form of a colloidal solution (gel state) which already leads to the development of their activity. After leaving the centrifugal dryer 11, the washed grain, which may, for example, have a moisture content of 20% (weight percent calculated on the basis of the total weight), is transported into a heating shaft (soaking column) 13 by means of a bucket conveyor 12. In the heating shaft 13, the grain is heated to a temperature of, for instance, 28° C, by means of a heat register or heat registers in a continuous operation. Subsequently, the grain falls into an activator or container 14 of corresponding volume, the container 14 here being assumed to be in the form of an insulated round silo composed of corrosion-resistant material. The grain remains in the silo 14 for a period of 10 to 20 hours, for example, while temperature (e.g. 28° C) and moisture (e.g. 20% by weight) are maintained as constant as possible. If necessary, temperature regulating means may be provided for regulating the temperature in the silo 14 and water supply means such as, for example, a water supply network or a spraying arrangement for the automatic spraying of regulated quantities of water, may be provided for introducing moisture into the interior of the silo 14. Such temperature regulating means and water supply means have not been illustrated here for the sake of clarity.

After about 10 or 20 hours, that is, after the actual enrichment phase, the grain leaves the storage container, namely, the silo 14, via a bottom valve 15. The latter is advantageously constructed in the form of an agitable or vibratory valve. Instead of the valve 15, it may also be possible to provide an agitable or vibratory sieve. The grain then passes into the steam zone or chamber 16 provided with a conveyor which is here illustrated as being in the form of a screw conveyor. The purpose of passing the grain through the steam chamber 16 is to destroy microorganisms which may be present in the grain and the grain may, for example, remain in the steam chamber 16 for a period of about 3 minutes at a temperature of approximately 70° C.

After passing through the steam chamber 16, the grain is conveyed into a heating shaft (soaking column) 17. Here, the grain is heated to temperatures between about 40° and 50° C for a period of, for instance, approximately 60 minutes, in a continuous operation. In the heating shaft 17, decomposition of Phytin takes place. Advantageously, the constancy of the moisture content of, for example, 20% by weight, is also strictly maintained here and, if desirable or necessary, provision may be made for the introduction of some quantities of water via a spraying apparatus. The stream of grain travels continuously further and is cooled and dried back to a moisture content such that the grain is transformed into a state suitable for storage or for grinding. Thus, the stream of grain travels continuously further from the heating shaft 17 into a drying shaft 18 and is thereby dried to a moisture content suitable for storage or for grinding, that is, to a residual moisture content of approximately 14 to 16% by weight.

Before the dried grain is admitted into a storage vessel or the like, it is now still conveyed through a brushing and suction arrangement which is indicated generally by the reference numeral 19. Here, another surprising advantage of the invention appears. Due to swelling of the outer layers of the grain kernels, these outer layers expand. During the drying of the grain back to a moisture content suitable for storage or for grinding, or during the treatment at 40° to 50° C in the heating shaft 17, the outer layers shrink. The result of this is that the outer skins of the grain kernels become loosened. These loosened and partially rolled up portions of the outer skins of the grain kernels may, at least to a large extent, be removed by passing the grain over a soft brush and by permitting sufficient movement of the grain kernels relative to one another. This enables an increased cleanliness or purity to be achieved and further makes it possible to attain a reduction of at least 50% in the volatilizable contamination residues which adhere to the outer skins of the grain kernels. To this end, the grain kernels are freed from the loosened portions of the outer skins during the last treatment phase in the suction apparatus.

As indicated previously, the reference numeral 19 generally indicates a device for cleaning the grain. It may be seen that the device 19 includes brush aggregates 20 and, further, that the device 19 communicates with a conduit 21 which is connected with a suitable source of suction. The grain enters the device 19 from the drying shaft 18 and, in the device 19, the loosened and partially rolled up portions of the outer skins of the grain kernels are removed, at least to a large extent. This, as just indicated, concomitantly leads to increased cleanliness or purity and may also result in a reduction of at least 50% in the volatilizable contamination residues which adhere to the outer skins of the grain kernels. The suction conduit 21 enables the grain kernels and the outer skins thereof to be separated and the grain kernels may leave the device 19 via the bottom thereof as indicated by the arrow.

Grain which has been treated in accordance with the method of the invention and is enriched with vitamins, and which has again been dried back to the starting moisture content, may be ground to the form of whole coarse ground grain or meal flour in conventional manner. It may also, however, be stored for extended periods of time without incurring losses in its original biological activities such as respiration and germinating capability.

A particularly advantageous circumstance which may arise in the treatment of grain kernels according to the invention resides in that the vegetable supply substance Phytin stored in the outer layers of the grain kernels may be decomposed into its reabsorbable and readily usable components inositol and phosphate due to the activation of the phytase enzymes. The substance Phytin itself is not only indigestible by humans but, by virtue of the formation of insoluble calcium, iron or magnesium salts, may even be a source of trouble since it blocks the reabsorption of these mineral substances which are necessary for life.

The method according to the invention is suitable as a continuous grain activation treatment. Accordingly, it may advantageously be incorporated in the industrial mill processing sequence of a mill for the production of whole coarse ground grain or in a conventional flour mill. However, in view of the operating sequence of the method according to the invention, it may be necessary to supplement the apparatus present in such mills by special apparatus. A continuous grain activation in the sense and within the scope of the present invention may, for instance, be carried out as detailed above.

In any event, the treatment of the grain kernels is preferably effected so carefully that no injury to the same occurs. The germ of the grain kernels is not affected.

The capacity of the mill, for instance, two tons per hour, may determine the order of the size of the washing device 10, the bucket conveyor 12, the heating shaft 13 and the insulated round silo 14. Depending upon the dwell time of the grain which is, for example, heated to temperatures between 25° and 30° C, the capacity of the silo 14 may vary from 12 to 40 tons.

As pointed out previously, the discharge valve 15 at the lower end of the silo 14 is advantageously in the form of a so-called agitable or vibratory valve. The purpose of this is to achieve, as far as possible, a completely uniform sinking and emptying of the contents of the silo 14. The steam chamber 16 provided with the screw conveyor, which is arranged downstream of the silo 14 and the valve 15, as well as the following two-part shaft comprising the heating shaft 17 and the drying shaft 18, favorably likewise have sizes which are determined on the basis of a capacity of the order of 2 tons per hour. Moreover, the brushing and suction aggregate 19, which is arranged downstream of the drying shaft 18 and which should be carefully regulated so that the germinating capability of the grain is not reduced, also favorably corresponds to a capacity of 2 tons per hour. Mill capacity here assumed at 2 tons per hour.

Advantageously, a "Miag" brush worm having a fine sieve and provided with suction means is used as the device 19 provided with the brush aggregates 20 and the suction arrangement 21. The reason is that such a "Miag" apparatus operates with particular gentleness.

It will be understood that each of the elements described above, or two or more together, may also find a useful application in other types of methods and arrangements differing from the types described above.

While the invention has been illustrated and described as embodied in a method and arrangement for the natural vitaminizing of cereal grain, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for the natural vitaminizing of grain, comprising holding said grain in the temperature range of about 25° to 35° C for a period of about 5 to 30 hours while maintaining the moisture content of said grain in the moisture content range of about 18 to 24 percent by weight; and thereafter drying said grain to a moisture content of about 14 to 16 percent by weight.

2. A method as defined in claim 1, wherein said grain is agitated while being held in said temperature range.

3. A method as defined in claim 1, wherein said grain is treated prior to the holding step so as to adjust the moisture content thereof to within said moisture content range.

4. A method as defined in claim 3, wherein said grain is cleaned in a dry state and washed with water prior to said adjustment.

5. A method as defined in claim 4, wherein said adjustment comprises increasing the moisture content of said grain and the moisture content of said grain is increased by supplying additional quantities of water to said grain subsequent to said washing.

6. A method as defined in claim 3, wherein said grain is heated to said temperature range subsequent to said adjustment.

7. A method as defined in claim 3, wherein the moisture content of said grain is adjusted to a value of about 20 percent by weight and is maintained substantially constant at said value while said grain is held in said temperature range.

8. A method as defined in claim 3, wherein said grain is cooled subsequent to being held in said temperature range.

9. A method as defined in claim 8, wherein a stream of said grain is substantially continuously heated to temperatures of about 40° to about 50° C subsequent to being held in said temperature range and prior to being cooled so as to cause the decomposition of Phytin.

10. A method as defined in claim 9, wherein at least portions of the outer skins of the individual grains become loosened and roll up due to swelling of said outer skins during said adjustment and the subsequent cooling of said grain, said grain being subjected to a mechanical treatment subsequent to said drying so as to free said grain from said portions of said outer skins and thereby also remove at least 50 percent of the detectable contaminants from said grain.

11. A method as defined in claim 10, wherein said mechanical treatment comprises subjecting said grain to a brushing action, said grain also being exposed to suction so as to aid in the removal of said portions of said outer skins and said detectable contaminants from said grain.

12. A method as defined in claim 1, wherein said moisture content range is from about 18 to about 20 percent by weight.

13. A method as defined in claim 1, wherein said period is in the range of about 10 to about 30 hours.

14. A method as defined in claim 13, wherein said period is approximately 20 hours.

15. A method as defined in claim 1, wherein said temperature range is from about 28 to about 30° C.

16. A method as defined in claim 1, said grain being agitated during said drying so as to cause the individual grains to abrade one another; and wherein said grain is subjected to a brushing action subsequent to said drying for loosening contaminants from said grain, said grain also being exposed to suction subsequent to said drying so as to permit separation of said contaminants from said grain.

17. A method as defined in claim 1, wherein said grain is treated subsequent to being held in said temperature range so as to cause decomposition of Phytin.

18. A method as defined in claim 17, wherein said treatment comprises holding said grain at temperatures between about 40° and 50° C.

19. A method as defined in claim 17, wherein said treatment comprises holding said grain at temperatures between about 40° and 45° C for a period of approximately 60 minutes.

20. A method as defined in claim 1, wherein said grain is treated subsequent to being held in said temperature range so as to cause the destruction of microorganisms.

21. A method as defined in claim 20, wherein said treatment comprises holding said grain at a temperature of about 70° C for a period of about 3 minutes in the presence of steam.

22. A method as defined in claim 1, wherein the moisture content of said grain is maintained substantially constant while said grain is held in said temperature range.

23. A method as defined in claim 1, wherein the moisture content of said grain is maintained substantially within said moisture content range by automatically spraying regulated quantities of water onto said grain.

24. A method of naturally vitaminizing grain preparatory to the processing thereof so as to produce whole coarse ground grain, whole-wheat flakes and whole-wheat bread, comprising cleaning said grain in a dry state; thereafter washing said grain with water; supplying additional quantities of water to said grain so as to increase the moisture content thereof to a value of about 20 percent by weight; subsequently heating said grain to temperatures in the range of about 25° to 35° C; holding said grain in said temperature range for a period of about 10 to 30 hours while maintaining the moisture content thereof in the moisture content range of about 18 to 24 percent by weight and while subjecting said grain to motion; and thereafter cooling said grain and drying the same to a moisture content of about 14 to 16 percent by weight.

25. A method as defined in claim 24, wherein the heating step comprises heating said grain to temperatures of about 28° to 30° C and the holding step comprises holding said grain at the latter temperatures while maintaining the moisture content thereof at a value of about 20 percent by weight.

26. An arrangement for the natural vitaminizing of grain, comprising means defining a path of travel for the grain; holding means in said path for holding the grain under controlled temperature and humidity conditions, said holding means having an inlet end for the introduction of the grain therein and an outlet end for the discharge of the grain therefrom; an agitable valve member in the region of said outlet end so as to permit substantially uniform travel of the grain in a direction from said inlet end towards said outlet end; and drying means downstream of said holding means for reducing the moisture content of the grain which issues from said holding means.

27. An arrangement as defined in claim 26, comprising adjusting means upstream of said holding means for adjusting the moisture content of the grain prior to entry thereof into said holding means.

28. An arrangement as defined in claim 27, wherein said adjusting means comprises means for supplying water to the grain.

29. An arrangement as defined in claim 26, wherein said member comprises a vibratory valve.

30. An arrangement as defined in claim 26, wherein said holding means comprises an insulated round silo which includes a corrosion-resistant material.

31. An arrangement as defined in claim 26, comprising means upstream of said holding means for heating the grain prior to entry thereof into said holding means.

32. An arrangement as defined in claim 26, comprising means downstream of said holding means for continuously heating the grain which issues from said holding means to temperatures sufficient for the decomposition of Phytin to occur.

33. An arrangement as defined in claim 26, comprising a steam chamber downstream of said holding means for the destruction of microorganisms in the grain issuing from said holding means, and a screw conveyor for conveying the grain through said chamber.

34. An arrangement as defined in claim 26, comprising brush means downstream of said holding means for cleaning the grain which issues from said holding means, and suction means for separating contaminants from the grain.

35. An arrangement as defined in claim 26, comprising means upstream of said holding means for cleaning said grain in a dry state prior to entry thereof into said holding means.

* * * * *